US005846630A

United States Patent [19]

Tazaki et al.

[11] Patent Number: 5,846,630

[45] Date of Patent: Dec. 8, 1998

[54] MAGNETIC MIGRATION DISPLAY PANEL

[75] Inventors: Hiroshi Tazaki; Teruaki Nojima, both of Hiratsuka, Japan

[73] Assignee: Kabushiki Kaisha Pilot, Tokyo, Japan

[21] Appl. No.: 848,158

[22] Filed: Apr. 29, 1997

[30] Foreign Application Priority Data

Jul. 25, 1996 [JP] Japan .................................... 8-225773

[51] Int. Cl.[6] ........................................................ B32B 3/00

[52] U.S. Cl. ................................ 428/68; 40/449; 346/21; 346/135.1; 428/72; 428/76; 428/692; 428/900; 434/409

[58] Field of Search ................................. 428/68, 72, 76, 428/900, 692; 40/449; 346/21, 135.1; 434/409

[56] References Cited

U.S. PATENT DOCUMENTS

| | | | |
|---|---|---|---|
| 4,536,428 | 8/1985 | Murata | 428/117 |
| 4,884,146 | 11/1989 | Yatsunani | 358/400 |
| 5,604,175 | 2/1997 | Nakabayashi | 503/201 |

*Primary Examiner*—Nasser Ahmad
*Attorney, Agent, or Firm*—Foley & Lardner

[57] ABSTRACT

A magnetic migration display panel including a dispersion liquid layer composed of a magnetic particle, a dispersion medium composed of an organic solvent, a thickening agent composed of fatty acid bis-amide with a hydroxyl group having a melting point of 120° C. to 160° C., and a coloring material as desired, on a substrate is provided.

19 Claims, No Drawings

MAGNETIC MIGRATION DISPLAY PANEL

BACKGROUND OF THE INVENTION

The present invention relates to a magnetic migration display panel capable of displaying a distinct record by magnetism and capable of then erasing the record.

Conventional magnetic migration display panels for displaying by migrating magnetic particles utilizing magnetism include an enclosed space in a multi-cell structure formed between two substrates where a plastic dispersion liquid including magnetic particles, dispersion medium, thickening agent, and if desired coloring material is enclosed, or includes a layer of microcapsules enclosing the plastic dispersion liquid formed on a substrate.

In a magnetic migration display panel, when writing with a magnetic pen, a head with electromagnets, or the like along the substrate on the front side, a written line is displayed based on a contrast of a color of the plastic dispersion liquid and a color of the magnetic particles. This contrast is produced by migrating the magnetic particles attracted by magnetism of the magnetic pen, the electromagnet, or the like from the substrate on the back side.

The magnetic migration display panel can generally display a written letter, pattern, or the like by attracting the magnetic particles in a dispersion system to a recording magnet. However, the panel has the following problems:

(a) Displaying for a long time cannot be maintained due to sedimentation of the attracted magnetic particles because the specific gravity of the magnetic particles is greater than that of the dispersion system.

(b) A written line can not be displayed distinctly due to attraction of the magnetic particles existing far from the magnet because all magnetic particles receiving magnetism from the magnet are attracted to the magnet. To overcome these problems, a yield value is set by adding a thickening agent to the plastic dispersion liquid, thereby the migration of the magnetic particles occurs when applying a force more than the yield value as described in Japanese Examined Publication No. 57-27463 by the inventors of the present invention.

In the conventional magnetic migration display panel, there was a problem that a whisker-like projection, a broken line, or the like is generated in the written line after successive writing and erasing with a writing magnet and an erasing magnet, even though an initial written line was distinct, having no blur line and no broken line.

Through intense study of the present inventors, it was found that these phenomena may occur due to a temporary fracture of a frail three-dimensional structure formed by the thickening agent in the dispersion medium. Therefore, the inventors determined that the original frail three-dimensional structure formed by the thickening agent in the dispersion medium should be quickly reformed after its fracture, even though the temporary fracture of the frail three-dimensional structure occurs, to obtain a magnetic migration display panel capable of displaying stable distinct written lines constantly.

The frail three-dimensional structure formed by the thickening agent utilizing a network of hydrogen bonds or the like is easily densified as time goes by, and is accelerated by heating. Especially when using an organic thickening agent, the nearer a melting point of the thickening agent is to a storage temperature, the greater the swelling of the particles of the thickening agent is, thereby a firm network is generated. It is found that recording and erasing cannot be practically conducted in such a case.

In fact, the magnetic migration display panel is frequently disposed in a car or a transportation container exposed to summer sun's rays, where the temperature reaches 50° C. or more. If the display panel is left under the high temperature of 40° C. or more, a performance of displaying or erasing is suffered an adverse effect for the above reason. It is not desirable for merchandise that a difference is generated in the performance depending upon the ambient temperature for use or the place of use.

SUMMARY OF THE INVENTION

The present invention relates to a magnetic migration display panel including a dispersion liquid layer composed of a magnetic particle, a dispersion medium, a thickening agent, and a coloring material as desired, on a substrate. The dispersion medium can be an organic solvent. The thickening agent can be a fatty acid amide with a hydroxyl group having a melting point of 120° C. to 160° C. The dispersion liquid can have a yield value. The dispersion medium can be a nonpolar organic solvent. The thickening agent can be selected from the group consisting of alkylene-bis-12-hydroxy stearic acid amide and/or phenylene-bis-12-hydroxy stearic acid amide, and 1 to 10% by weight thereof can be mixed in the dispersion liquid.

DETAILED DESCRIPTION OF PREFERRED EMBODIMENTS

A dispersion liquid layer in a magnetic migration display panel of the present invention is obtained by mixing magnetic particles, a dispersion medium, the above-mentioned thickening agent, and a coloring material or the like as required.

As a thickening agent for use with the present invention, there is used one or more fatty acid amides with a hydroxyl group having a melting point of 120° C. to 160° C. Any such amides can be used. For example, alkylene-bis-12-hydroxy stearic acid amide and/or phenylene-bis-12-hydroxy stearic acid amide are useful. For example, methylene-bis-12-hydroxy stearic acid amide, ethylene-bis-12-hydroxy stearic acid amide, butylene-bis-12-hydroxy stearic acid amide, hexamethylene-bis-12-hydroxy stearic acid amide, xylylene-bis-12-hydroxy stearic acid amide, and the like are useful. One to 10% by weight of a single amide or a combination of amides can be used in the dispersion liquid. Further, other inorganic or organic thickening agents may be used as auxiliary thickening agents.

The fatty acid bis-amide with a hydroxyl group as the thickening agent preferably has a melting point of 120° C. to 160° C.

As described above, the network structure formed of the dispersion liquid by the thickening agent is promoted by heating. Especially if the temperature is near to the melting point of the thickening agent, the particles in the thickening agent swell, thereby generating a firm network. Consequently, migration of the magnetic particles are restricted more than necessary, which may result in the incapability of writing and erasing.

Therefore, taking a temperature of the magnetic migration panel in service into consideration, not less than 120° C. for the melting point of the thickening agent is effective in practice use. However, an effect that the thickening agent produces colloidal gel structure by swelling and dispersing in the solvent requires heating at about the melting point. Therefore, an excessive high melting point is not desirable in view of safety and workability. Therefore, more than 160° C. for the melting point is not preferable for practical production.

Any desired magnetic particles can be used in any desired amount. For example, as the magnetic particles, 10 to 30% by weight of oxide magnetic materials such as black magnetite, γ-hematite, chromium dioxide, ferrite, or the like, and metal magnetic material such as alloys made of cobalt, nickel, or the like as powder or lamina in the dispersion liquid can be used. The magnetic particles may be granulated prior to use for the purpose of adjusting size, shape, or the like. Applicable size is from micro to large, and applicable shape is globular, columnar, mass, lamina, or the like depending on the purpose for use. In using the magnetic particles, various coloring agents can be mixed with the magnetic particles and/or surfaces of the magnetic particles can be coated with various materials to change the original color of the particles. If a scattering in size of magnetic particles exists, migration ability is also scattered. Therefore, uniform size of the magnetic particles is preferable to achieve a distinct display.

As the dispersion medium, any organic solvents are useful. Nonpolar solvents such as oil, aliphatic hydrocarbon or the like, and polar solvents such as glycol, alcohol and the like can be used. Especially, aliphatic hydrocarbon such as isoparaffin or the like is preferable.

Optionally, any desired coloring material can be used. As the coloring material, white pigment, dyestuff, or other pigment can be used. Preferably not more than 10%, more preferably not more than 3% of coloring material, based on the total weight of the dispersion, is added to the plastic dispersion liquid to improve a contrast of the plastic dispersion liquid and the magnetic particles, resulting in a distinct display. Excess amount of the coloring material may cause a blurred display with the magnetic particles.

According to one embodiment of the present invention, a magnetic migration display panel is manufactured by forming an enclosed space with a multiple cell structure on a substrate, filling a plastic dispersion liquid into the enclosed space, and pasting another substrate thereon.

According to another embodiment of the present invention, a magnetic migration display panel is manufactured by filling a plastic dispersion liquid into an enclosed space made from many concave portions formed on a substrate and pasting another substrate thereon. The concave portions are formed on one or both of the substrates and the substrates bound together by a paste for forming the independent enclosed space therebetween.

According to yet another embodiment of the present invention, a magnetic migration display panel is manufactured by applying microcapsules that enclose a plastic dispersion liquid and binding them to a substrate using a binder. When occasion demands, a protective layer may be formed on a surface of the microcapsule applying layer to prevent the microcapsules from fracture by a friction stress.

EXAMPLE 1

(a) Producing Plastic Dispersion Liquid 2.5 parts by weight of BIS-AMIDE KH (methylene-bis-12-hydroxy stearic acid amide manufactured by Nippon Kasei Co., Ltd) was added to 80.0 parts by weight of ISOPER-M (isoparaffin solvent manufactured by Esso Kagaku Co., Ltd). The mixture was heated to dissolve the amide and was cooled to obtain a dispersion liquid of BIS-AMIDE KH.

82.5 parts by weight of the dispersion liquid and 1 part by weight of TIPAQUE CR-50 (titanium oxide manufactured by Ishihara Sangyo Co., Ltd) were mixed using T.K. HOMOMIXER (wet dispersing machine manufactured by Tokushu Kakogyo Co., Ltd) to obtain 83.5 parts by weight of a white dispersion liquid.

80 parts by weight of TODA COLOR KN-320 (Magnetite manufactured by Toda Kogyo Co., Ltd) and 50 parts by weight of EPOTOHTO YD-017 (solid epoxy resin manufactured by Tohto Kasei Co., Ltd) in 40% of methylethyl ketone solution were kneaded. The mixture was dried and pulverized to obtain 50 parts by weight of black magnetic particles having 20 to 120 μm in diameter.

16.5 parts by weight of the magnetic particles and 83.5 parts by weight of the white dispersion liquid were mixed to produce 100 parts by weight of the plastic dispersion liquid of the present embodiment.

A yield value thereof was 18.8 dyne/cm$^2$ measured by a direct method using a type B viscometer.

(b) Manufacturing a magnetic Migration Display Panel

Firstly, a multiple cell plate in a honeycomb structure having about 0.8 mm in height in a shape of rough complete hexagon with about 2 mm of each side formed by 0.065 mm of vinyl chloride in thickness was adhered to a vinyl chloride sheet having a thickness of about 0.15 mm by using a ethylene-vinyl acetate series adhesive agent as a face side transparent substrate to produce a display panel member. Secondly, the plastic dispersion liquid was filled into each enclosed space in the multiple cell structure and the multiple cell plate was sealed with about 0.08 mm of transparent vinyl chloride sheet using an epoxy series adhesive agent to manufacture a magnetic migration display panel (Embodiment A).

EXAMPLES 2 TO 8

(a) Producing Plastic Dispersion Liquids

The plastic dispersion liquids of each embodiment were prepared using compositions shown in Table 1, as in Example 1. The yield values of the plastic dispersion liquid in each embodiment were shown in Table 1.

(b) Manufacturing Magnetic Migration Display Panels

The magnetic migration display panels filled with each dispersion liquid were manufactured as in Example 1 (Embodiment A).

EXAMPLE 9

(a) Producing a Plastic Dispersion Liquid

The plastic dispersion liquid was prepared as in Example 1.

(b) Manufacturing a Magnetic Migration Display Panel

Firstly, a plurality of successive concave portions in a shape of rough complete hexagon with about 2 mm of each side having about 1.3 mm in depth were formed on a vinyl chloride sheet having a thickness of about 0.15 mm using a vacuum forming mold to form a rear side transparent substrate. Secondly, the plastic dispersion liquid was filled into each concave portion, and the rear side transparent substrate was sealed with about 0.08 mm of transparent vinyl chloride sheet in thickness as a face side substrate using an epoxy series adhesive agent to manufacture a magnetic migration display panel (Embodiment B).

EXAMPLE 10

(a) Producing A Plastic Dispersion Liquid

The plastic dispersion liquid was prepared using compositions shown in Table 1, as in Example 1. The yield value of the plastic dispersion liquid was shown in Table 1.

(b) Manufacturing A Magnetic Migration Display Panel

First, 20 g of the dispersion liquid was added to 60 g of 10% gelatine solution to stir so as to be about 500 μm in a drop diameter of the dispersion liquid. Second, 60 g of 10% gum arabic solution was added to further stir the liquid. Third, 300 g of hot water at 50° C. was added to the liquid to be kept at 50° C. in the system. Fourth, acetic acid was added to achieve pH 4.2. Fifth, the system was cooled gradually to be at 50° C. Sixth, 10 g of 25% of glutaric aldehyde solution was added to harden a capsule film. Seventh, 10% sodium hydroxide solution was added to the liquid to achieve pH 10.5 in the system. Finally, temperature of the system was increased to 50° C. and maintained for 1 hour, and then was cooled gradually to room temperature to produce a micro capsule of the plastic dispersion liquid.

The microcapsule was dispersed in an aqueous binder, applied to a polyester film having a thickness of 50 μm, and then dried to form a micro capsule dispersion layer. Further 100 μm thick polyester film applied within 100 μm adhesive layer in advance was stacked thereon to manufacture a magnetic migration display panel (Embodiment C).

COMPARATIVE EXAMPLES 1 TO 3

(a) Producing Plastic Dispersion Liquids

The plastic dispersion liquids were prepared using compositions shown in Table 1, as in Example 1. The yield value of the plastic dispersion liquid were shown in Table 1.

(b) Manufacturing Magnetic migration Display Panels

The magnetic migration display panels filled with each dispersion liquid were manufactured as in Example 1 (Embodiment A).

TABLE 1

| | | | | Examples | | | | | | | | | | Comparative Examples | | |
|---|---|---|---|---|---|---|---|---|---|---|---|---|---|---|---|---|
| | | | | 1 | 2 | 3 | 4 | 5 | 6 | 7 | 8 | 9 | 10 | 1 | 2 | 3 |
| Composition | Thickening agent | L | Melting point 141° C. | 2.5 | | | | | | | | | | | | |
| | | M | Melting point 144° C. | | 2.5 | | | | 2.5 | 1.0 | 1.5 | 2.5 | | | | |
| | | N | Melting point 138° C. | | | 2.5 | | | | | | | | | | |
| | | O | Melting point 133° | | | | 2.5 | | | | | | 1.0 | | | |
| | | P | Melting point 125° C. | | | | | 2.5 | | | | | | | | |
| | | Q | Melting point 145° C. | | | | | | | | | | | 2.5 | | |
| | | R | Melting point 110° C. | | | | | | | | | | | | 2.5 | |
| | | Silicic acid micro powder | | | | | | | | | 1.0 | | | | | 1.0 |
| | Dispersion medium | Isoparaffin Solvent | | 80.0 | 80.0 | 80.0 | 80.0 | 80.0 | | | 80.0 | 80.0 | 85.0 | 80.0 | 80.0 | 81.5 |
| | | Ethylene Glycol | | | | | | | 80.0 | | | | | | | |
| | | Spindle Oil | | | | | | | | 81.5 | | | | | | |
| | Magnetic particles | Magnetite | | 16.5 | 16.5 | 16.5 | 16.5 | 16.5 | 16.5 | 16.5 | 16.5 | 16.5 | 13.0 | 16.5 | 16.5 | 16.5 |
| | Coloring materials | Titanium oxide | | 1.0 | 1.0 | 1.0 | 1.0 | 1.0 | 1.0 | 1.0 | 1.0 | 1.0 | 1.0 | 1.0 | 1.0 | 1.0 |
| Yield value dyne/cm$^2$ | | | | 18.8 | 32.3 | 11.9 | 5.2 | 6.2 | 9.3 | 11.2 | 34.0 | 32.3 | 1.3 | 0 | 0 | 23.1 |
| Embodiment applied to a panel | | | | A | A | A | A | A | A | A | A | B | C | A | A | A |

2L: methylene-bis-12-hydroxy stearic acid amide (Nippon Kasei Co., Ltd, registered trademark BISAMIDE KH)
M: ethylene-bis-12-hydroxy stearic acid amide (Ito Seiyu Co., Ltd, registered trademark J-530)
N: butylene-bis-12-hydroxy stearic acid amide (Nippon Kasei Co., Ltd, registered trademark SURIPAX ZBH)
O: hexamethylene-bis-12-hydroxy stearic acid amide (Ito Seiyu Co., Ltd, registered trademark J-630)
P: m-xylylene-bis-12-hydroxy stearic acid amide (Nippon Kasei Co., Ltd, registered trademark SURIPAX PXH)
Q: ethylene-bis stearic acid amide (Ito Seiyu Co., Ltd, registered trademark J-550S)
R: 12-hydroxy stearic acid amide Nippon Kasei Co., Ltd, registered trademark DIYAMIDDO KH)

Test Method and Evaluation Thereof

The magnetic migration display panels according to the above examples and the above comparative examples were tested for the following items, where a permanent magnet (2×2×3 mm in size) equivalent to JIS C2502 MPB380 was used to write down at 25 cm/sec of a written speed, and a anisotropic gum magnet (NT-5M-1504 manufactured by MagX Co., Ltd) with one surface magnetized was used to erase.

(1) Retentivity of Display

After leaving the writing for 1 day at a standstill, written lines were visibly observed.

○ . . . no magnetic particles on the written lines were migrated down, and the written lines were distinct.

x . . . magnetic particles on the written lines were migrated down, and the written lines were blurred or disappeared.

(2) Distinctness of Display

The written lines were visibly observed.

○ . . . Widths of the written lines were constant and were displayed distinctly.

x . . . Whisker-like projections or broken lines occurred in the written lines.

(3) Stability of Display

After repeating writing and erasing 50 times, the written lines were visibly observed.

○ . . . Widths of the written lines were constant and were displayed distinctly.

x . . . Whisker-like projections or broken lines occurred in the written lines.

(4) Display and erase abilities after keeping the temperature.

After keeping the temperature of the magnetic migration display panel in each example and each comparative example, displaying and erasing were conducted. Vividness of display and complete erasability of the display at a time were observed in cases of leaving the panel at 0° C., at 20° C., or 60° C. for one week, respectively.

○ . . . The written lines were displayed distinctly, and were erased completely at one operation without leaving an afterimage.

x . . . The written line were not displayed distinctly, and were not erased completely at one operation leaving an afterimage.

Evaluations of each test are shown in Table 2.

TABLE 2

| | Evaluation | | | | | |
|---|---|---|---|---|---|---|
| | Retentivity of display | Distinctness of display | Stability of display | Display and erase abilities time elapsed after keeping the temperature | | |
| Example 1 | ○ | ○ | ○ | ○ | ○ | ○ |
| Example 2 | ○ | ○ | ○ | ○ | ○ | ○ |
| Example 3 | ○ | ○ | ○ | ○ | ○ | ○ |
| Example 4 | ○ | ○ | ○ | ○ | ○ | ○ |
| Example 5 | ○ | ○ | ○ | ○ | ○ | ○ |
| Example 6 | ○ | ○ | ○ | ○ | ○ | ○ |
| Example 7 | ○ | ○ | ○ | ○ | ○ | ○ |
| Example 8 | ○ | ○ | ○ | ○ | ○ | ○ |
| Example 9 | ○ | ○ | ○ | ○ | ○ | ○ |
| Example 10 | ○ | ○ | ○ | ○ | ○ | ○ |
| Comparative Example 1 | X | X | X | X | X | X |
| Comparative Example 2 | X | X | X | X | X | X |
| Comparative Example 3 | ○ | X | X | X | X | X |

According to the magnetic migration display panel of the present invention, a plastic dispersion liquid composed of fatty acid bis-amide with a hydroxyl group having a melting point of 120° C. to 160° C. is used as a thickening agent. Therefore, excellent stability after time elapsed is obtained and no change in nature of the plastic dispersion liquid depending on a temperature used is presented. Thereby, a remarkable enhanced performance of the display panel such as recordability, retentivity, distinctness, erasability or the like in displaying is obtained constantly.

The entire disclosure of Japanese Patent Application No. 8-225773, including specification, drawings and claims are herein incorporated by reference in its entirety.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A magnetic migration display panel comprising a dispersion liquid including magnetic particles, a dispersion medium, a thickening agent, and optionally a coloring material, on a substrate, wherein said dispersion medium comprises an organic solvent, wherein said thickening agent comprises a fatty acid amide with a hydroxyl group having a melting point of 120° C. to 160° C., and wherein said dispersion liquid has a positive yield value.

2. The magnetic migration display panel according to claim 1, wherein said organic solvent comprises a nonpolar organic solvent.

3. The magnetic migration display panel according to claim 1, wherein said thickening agent is selected from one or more of the group consisting of alkylene-bis-12-hydroxy stearic acid amide and phenylene-bis-12-hydroxy stearic acid amide, and the dispersion liquid comprises 1 to 10% by weight of the thickening agent, based on the total weight of the dispersion liquid.

4. The magnetic migration display panel according to claim 1, wherein the dispersion liquid comprises 10 to 30% by weight of said magnetic particle, based on the total weight of the dispersion liquid.

5. The magnetic migration display panel according to claim 1, wherein said dispersion liquid is located between two substrates.

6. The magnetic migration display panel according to claim 5, wherein said dispersion liquid is located in an enclosed space in a multiple cell structure formed between said two substrates, and wherein said yield value of said dispersion liquid is 1 to 50 dyne/cm$^2$.

7. The magnetic migration display panel according to claim 1, wherein said dispersion liquid is located in an enclosed space formed by a plurality of concave portions on the substrate and another substrate that covers said concave portions and is adhered to the former substrate, and wherein said yield value of said dispersion liquid is 1 to 50 dyne/cm$^2$.

8. The magnetic migration display panel according to claim 1, wherein said dispersion liquid is encapsulated and said encapsulated dispersion liquid is adhered to said substrate by a binder, and wherein said yield value of said dispersion liquid is 1 to 50 dyne/cm$^2$.

9. The magnetic migration display panel according to claim 2, wherein said thickening agent is selected from one or more of the group consisting of alkylene-bis-12-hydroxy stearic acid amide and phenylene-bis-12-hydroxy stearic acid amide, and the dispersion liquid comprises 1 to 10% by weight of the thickening agent, based on the total weight of the dispersion liquid.

10. The magnetic migration display panel according to claim 2, wherein the dispersion liquid comprises 10 to 30% by weight of said magnetic particle, based on the total weight of the dispersion liquid.

11. The magnetic migration display panel according to claim 2, wherein said dispersion liquid is located between two substrates.

12. The magnetic migration display panel according to claim 11, wherein said dispersion liquid is located in an enclosed space in a multiple cell structure formed between said two substrates, and wherein said yield value of said dispersion liquid is 1 to 50 dyne/cm$^2$.

13. The magnetic migration display panel according to claim 2, wherein said dispersion liquid is located in an enclosed space formed by a plurality of concave portions on the substrate and another substrate that covers said concave portions and is adhered to the former substrate, and wherein said yield value of said dispersion liquid is 1 to 50 dyne/cm$^2$.

14. The magnetic migration display panel according to claim 2, wherein said dispersion liquid is encapsulated and said encapsulated dispersion liquid is adhered to said substrate by a binder, and wherein said yield value of said dispersion liquid is 1 to 50 dyne/cm$^2$.

15. The magnetic migration display panel according to claim 3, wherein the dispersion liquid comprises 10 to 30% by weight of said magnetic particle, based on the total weight of the dispersion liquid.

16. The magnetic migration display panel according to claim 3, wherein said dispersion liquid is located between two substrates.

17. The magnetic migration display panel according to claim 16, wherein said dispersion liquid is located in an enclosed space in a multiple cell structure formed between said two substrates, and wherein said yield value of said dispersion liquid is 1 to 50 dyne/cm$^2$.

18. The magnetic migration display panel according to claim 3, wherein said dispersion liquid is located in an enclosed space formed by a plurality of concave portions on the substrate and another substrate that covers said concave portions and is adhered to the former substrate, and wherein said yield value of said dispersion liquid is 1 to 50 dyne/cm$^2$.

19. The magnetic migration display panel according to claim 3, wherein said dispersion liquid is encapsulated and said encapsulated dispersion liquid layer is adhered to said substrate by a binder, and wherein said yield value of said dispersion liquid is 1 to 50 dyne/cm$^2$.

* * * * *